Aug. 7, 1934.  V. L. RONCI  1,969,525
MACHINE FOR WORKING GLASS
Filed May 29, 1931   2 Sheets-Sheet 2

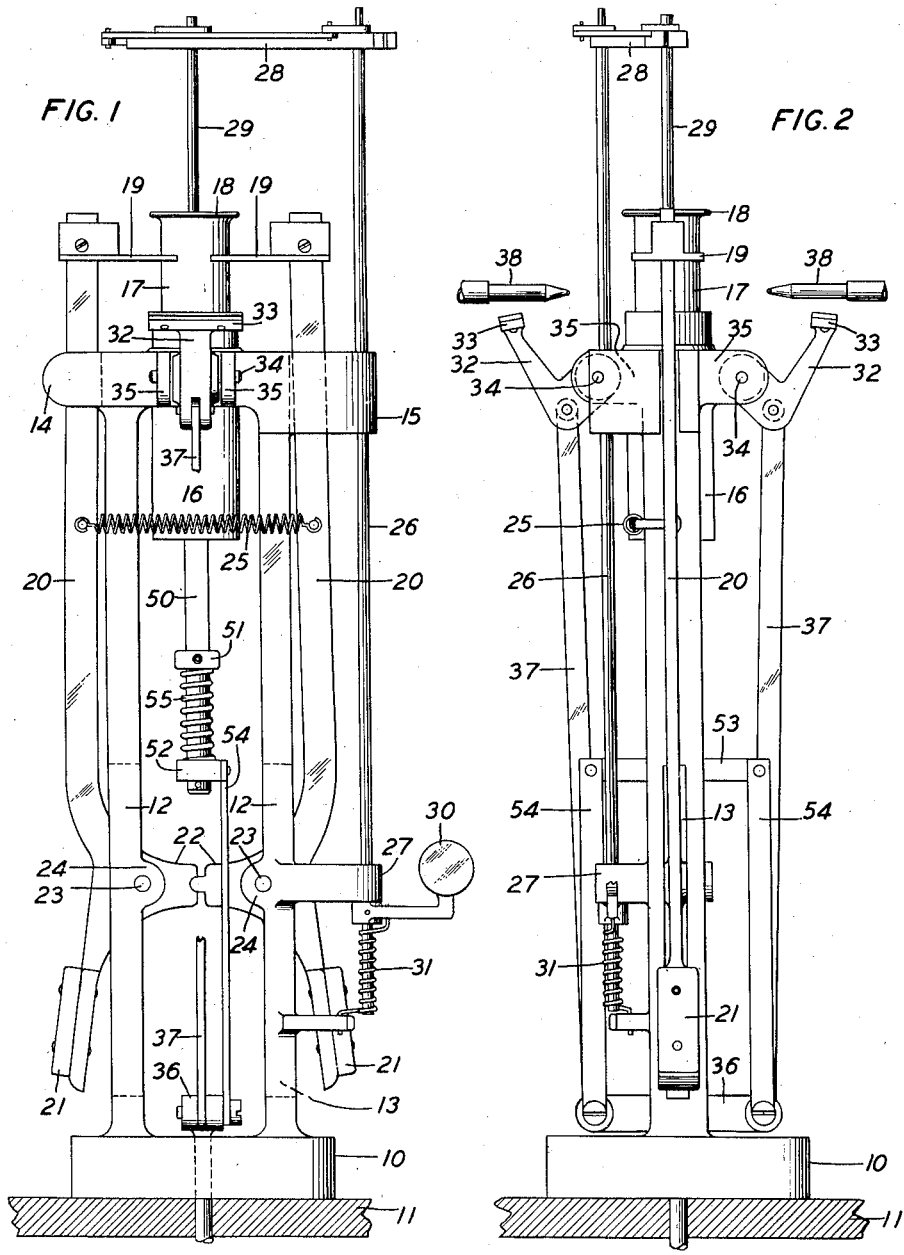

INVENTOR
V. L. RONCI
BY
Walter E. Kiesel
ATTORNEY

Patented Aug. 7, 1934

1,969,525

UNITED STATES PATENT OFFICE 1,969,525

MACHINE FOR WORKING GLASS

Victor L. Ronci, Brooklyn, N. Y., assignor to Bell Telephone Laboratories, Incorporated, New York, N. Y., a corporation of New York Application May 29, 1931, Serial No. 540,830

10 Claims. (Cl. 250—27.5)

This invention relates to machines for working glass and more particularly to a method and apparatus for forming vitreous stems and presses for electrical discharge devices.

Usually electrical discharge devices include an enclosing vessel having a reentrant stem terminating in a press, a plurality of rods and leading-in wires embedded in the press, and electrodes supported by the rods or leading-in wires. In the manufacture of such devices the stem is usually formed from a short length of glass tubing flared at one end. A plurality of rods are positioned within the tubing and held in proper space relation by a guide. A portion of the unflared glass is heated to render it plastic and is then formed into a press by a pair of movable clamps or jaws.

In such assemblies the spacing between the rods and leading-in wires is limited by the inner diameter of the cylindrical glass stem. This restricts the length of the insulating path between adjacent rods and wires and often necessitates the bending of the rods in order to enable attachment of the electrodes thereto. In order to increase the spacing of the rods in such assemblies to obtain a long insulating path between them, it is necessary to increase the diameter of the cylindrical stem and consequently to increase the size of the enclosing vessel, which involves a proportionate increase in the cost of the device.

An object of this invention is to increase the insulation between the supporting structures in an electrical discharge device.

Another object of this invention is to expedite and to simplify the manufacture of glass stems for such devices.

In accordance with this invention, stems for electrical discharge devices are made of glass tubing, the rods and leading-in wires being positioned therein by a guide block. The guide block is provided with pivoted arms which are drilled to accommodate the outermost of the rods and wires to be embedded in the press. A portion of the tubing is made plastic by heating and is formed into a press by suitable clamps or jaws. At the same time as the press is formed a central push rod within the guide block forces the pivoted guide arms outwardly and the outermost rods and wires are thereby spaced to a desired degree. The glass, being plastic, is drawn along with the movable rods so that a continuous press is formed in which the rods are rigidly embedded and a spacing of the rods greater than the diameter of the tubular stem is secured.

The features of this invention will be understood more clearly from the following detailed description with reference to the accompanying drawings.

Fig. 1 is a front view in elevation of a press forming machine embodying a guide block and associated actuating means therefor in accordance with this invention;

Fig. 2 is a side view of the press forming machine shown in Fig. 1;

Figure 3:
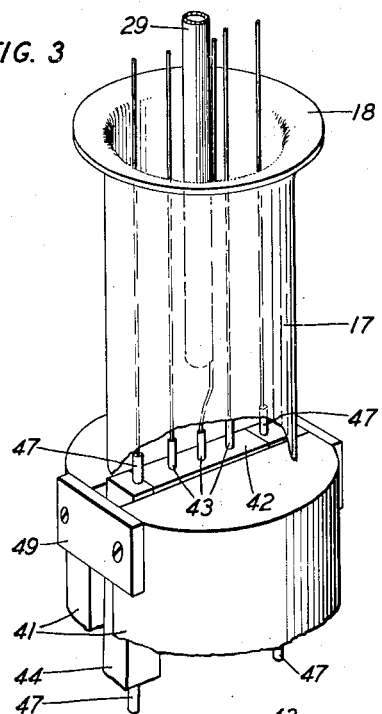
Fig. 3 is an enlarged detail view in perspective of a length of glass tubing and a portion of the guide block embodying this invention, showing the original position of the movable arms of the guide block and the leading-in wires and supporting rods.

Referring now to the drawings, the press forming machine comprises a base 10, which may be mounted upon a rotatable table or other support 11, and parallel supporting upright members 12. Each of the uprights is provided with a rectangular slot 13 adjacent the base 10 and at their opposite ends are formed connecting shoulders 14 and 15 which support a guide block assembly 16, to be described in detail hereinafter. A length of glass tubing 17 having a flared end 18 rests upon the guide block assembly 16 and is positioned by clamps 19 carried by levers 20. Each of the levers 20 is provided with a handle portion 21 and with a projecting fulcrum 22 positioned in the recess 13. The levers are pivoted in the slots 13 by pins 23 extending through journals 24 integral with the upright members 12. A coiled helical spring 25 is connected between the opposed levers 20 and maintains the clamps 19 in contact with the glass tubing 17. A rotatable rod 26 extends through the shoulder 15 and is supported parallel to the upright members by a lug 27 integral with the upright member 12 carrying the shoulder 15. The rod 26 carries a clamping assembly 28 which holds a thin glass tubulature 29 centrally within the tubing 17. The rod 26 may be rotated by an arm 30 to actuate the clamping assembly 28 against the action of a coiled spring 31.

A pair of angular arms 32 carrying press jaws 33 are pivoted on stub shafts 34 extending through flanges 35 integral with the shoulders 14 and 15 and are connected to a T-shaped reciprocating plunger 36 by lever rods 37. The plunger 36 extends through the base 10 and support 11 and is adapted to be raised by a cam or other lifting mechanism (not shown) at a predetermined time to bring the jaws 33 together and against a portion of the tubing 17 which has been rendered plastic by heating flames from the burners 38.

In forming presses with heads of the general construction described, the sequence of operations usually employed is as follows: The flared tubing 17 is placed upon the guide block and clamped in position by the arms 19. The thin tubulature 29 is positioned within the tubing 17 by the clamping assembly 28. A plurality of rods connected to leading-in wires are supported in fixed spaced relation within the tubing 17 by the guide block having a plurality of apertures therein into which the rods extend. The tubing 17 is then heated to render a portion thereof plastic and at a predetermined point in the sequence of operations the plunger 36 is lifted to cause the jaws 33 to press the plastic glass of the tubing 17 about the rods and leading-in wires. Simultaneously, the tubulature 29 is fused to the press portion thus formed.

In this process the spacing between the rods and leading-in wires is limited by the inner diameter of the tubing 17. This restricts the insulating paths available between the various leading-in wires for any given stem diameter and often necessitates the bending of the supporting rods connected to the leading-in wires in order to enable attachment of the electrodes thereto. Furthermore, it sometimes necessitates the use of relatively large tubing for the glass stems in order to obtain sufficient insulation between the leading-in wires, which in turn requires the use of a large enclosing vessel and results in the cost of the device being increased.

Figure 5:
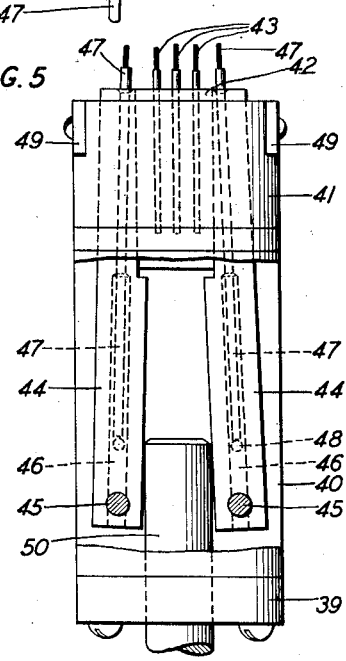
Fig. 5 is an enlarged detail view in elevation of the guide block assembly in accordance with this invention, with portions broken away to show details of construction.

In accordance with this invention, these difficulties are overcome by enabling the spreading of the outermost rods and leading-in wires simultaneously with the formation of the press. The guide block assembly 16, as shown in Fig. 5, comprises a centrally apertured base portion 39 and semi-cylindrical spaced side portions 40 bolted to the base 39 and terminating in substantially semi-cylindrical end portions 41. A guide insert 42 is secured between the end portions 41 and is provided with a plurality of spaced apertures for accommodating rods connected to leading-in wires 43. A pair of arms 44 having undercut sides lying adjacent the guide insert 42 are positioned between the spaced side portions 40, and each of the arms is pivotally mounted on a pin 45 extending between the side portions 40. The arms 44 are provided with a drilling 46 extending lengthwise thereof and adapted to receive rods connected to leading-in wires 47. Small pins 48 are fixed in the arms 44 and serve as stops for the rods. A pair of stop members 49 are attached to the end portions 41 to limit the outward displacement of the arms 44. A push rod 50 extends through the centrally apertured base 39 and engages the inclined surfaces of the arms 44. The rod 50 extends through a socket 52 attached to a cross piece 53 of frame 54 which is rigidly connected to the T-shaped plunger 36. The push rod 50 is connected to the frame by a coil spring 55 surrounding the rod and abutting against a collar 51 and the socket 52. A pin extending through the end of the rod projecting below the socket prevents displacement of the rod.

Figure 4:
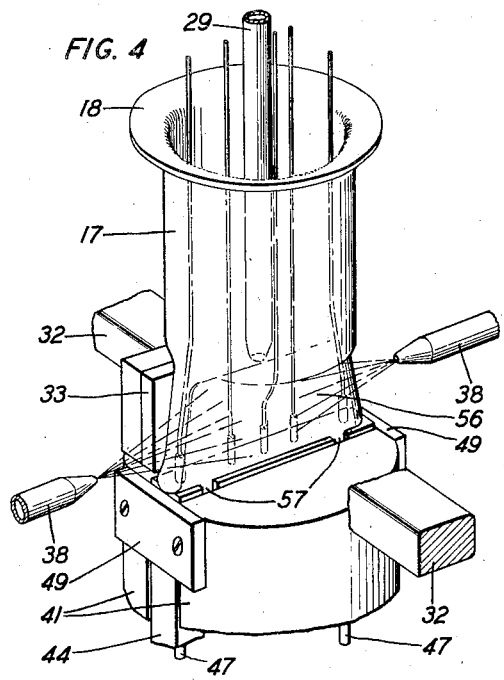
Fig. 4 is an enlarged detail view in perspective of the assembly shown in Fig. 3 illustrating the final position of the movable arms in the block and the location of the outermost leading-in wires and supporting rods in the press portion of the glass stem.

In the manufacture of stems in accordance with this invention the sequence of operations is as follows: A short length of flared tubing 17 is positioned upon the guide block assembly, as shown in Fig. 3, and rods 43 and 47 connected to leading-in wires are inserted in the guide insert 42 and the movable arms 44. A narrow tubulature 29 is positioned within the tubing 17. The tubing 17 is then heated by burners 38 to render a portion thereof plastic. At a predetermined time the plunger 36 is raised and the jaws 32 are brought together to form a press 56 as shown in Fig. 4. The lifting of the plunger raises the frame 54 and cross piece 53 which in turn forces the push rod 50 between the movable arms 44 and moves these arms outwardly. The movement of the arms 44 spaces the rods 47 which carry the plastic glass outwardly and the clamping jaws form the press as shown in Fig. 4. The degree of movement of the arms 44 may, of course, be controlled by the dimensioning of the end portions 41 and the position of the stops 49. The number of rods and leading-in wires and the spacing, relation and alignment thereof may likewise be varied to meet the particular requirements of any desired stem and press construction.

It will be seen from Fig. 4 that in the formation of the press a portion of the vitreous material is forced between the fixed guide insert 42 and the movable arms 44 and results in the formation of raised knobs 57 on the press. These knobs increase the insulation between the rods 43, 47 exterior to the press.

Figure 6:
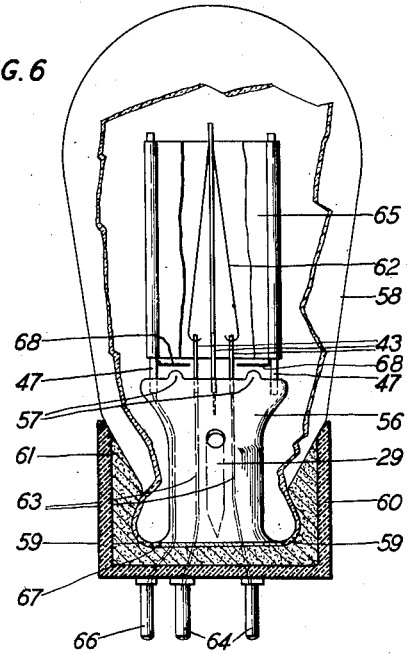
Fig. 6 illustrates an electron discharge device partly in section and partly broken away, embodying a stem and a press made in accordance with this invention.

An electron discharge device embodying a stem and press formed in accordance with this invention is shown in Fig. 6 and comprises an enclosing vessel 58 to which the flared portion 18 of a stem has been sealed as at 59. An insulating base 60 is secured to the enclosing vessel by suitable means, such as cement 61. A filamentary cathode 62 is supported by the rods 43, certain of which are connected to leading-in wires 63 which are in turn connected to terminal prongs 64 carried by the insulation base 60. An anode 65 is mounted on the rods 47, one of which is connected to a terminal prong 66 carried by the insulating base 60 by a leading-in wire 67. As is evident from this figure, no bending of the rods 47 is necessary to enable the direct attachment of the anode 65 thereto, and the anode 65 may be positioned very close to the press 56. Furthermore, a relatively long insulating path is provided between the anode and cathode supporting rods and the insulation therebetween is further increased by the raised knobs 57. In order to prevent the deposit of any of the cathode material upon the press and thereby to prevent the formation of leakage paths between the anode and cathode supporting rods, shields 68 may be mounted upon the anode supporting rods 47 adjacent the knobs 57.

Although a two-element electron discharge device has been shown and described, it is of course understood that the invention is equally applicable to stems having more than two electrodes supported from the same stem and press.

What is claimed is:

1. A machine for working glass comprising means for supporting a length of glass tubing, a multi-part guide for positioning a plurality of wires within said tubing, means for heating a portion of said tubing to render it plastic, means for forming said portion while plastic into a press about said wires, and means for spacing parts of said guide whereby certain of said wires are moved apart substantially parallel to one another while said press is still plastic.

2. In a machine for forming stems, a guide block assembly comprising a base, spaced side members mounted on said base, a guide member rigidly supported by said side members, a guide arm pivotally supported between said side members and positioned adjacent said guide member, and means for pressing said guide arm outwardly.

3. In a machine for forming stems, a guide block assembly comprising a base having an aperture therein, a pair of spaced side members mounted on said base, a guide member fixedly mounted between said side members, a pair of guide arms positioned between said side members on opposite sides of said guide member, said guide arms being pivoted to said side members, and a push rod extending through said apertured base engaging said guide arms.

4. A machine for working glass comprising a support including a base and a pair of upright members, a guide block assembly supported by said upright members, said assembly including a fixed block having a plurality of apertures therein for receiving wires and a pair of movable arms each having a bore therein for accommodating a wire, means for supporting a length of glass tubing on said guide block assembly, said tubing being positioned about said wires, means for heating a portion of said tubing to render it plastic, means for forming said plastic portion into a press about said wires, and means for spacing said movable arms of said guide block assembly.

5. A machine for forming stems for electrical discharge devices from glass tubing, comprising a standard, a guide block assembly carried by said standard, said assembly being provided with guides for positioning wires within said tubing, certain of said guides being movable, means for heating a portion of said tubing, movable jaws carried by said standard for forming said heated portion into a press, means for actuating said jaws, means for spacing said movable guides, and means for operating said first and second means simultaneously.

6. A machine for forming stems for electrical devices from vitreous tubing, comprising a base, a standard mounted on said base, means carried by said standard for supporting said tubing including a guide block assembly mounted on said standard for positioning a plurality of wires within said tubing, said assembly including a fixed guide member, a pair of pivoted guide members, and a push rod for moving said pivoted guide members apart, means for heating a portion of said tubing, press forming jaws pivoted on said standard, a plunger extending through said base, rigid connections between said press forming jaws and said plunger, and a yieldable linkage between said push rod and said plunger.

7. In the manufacture of stems from glass tubing having a plurality of wires embedded therein, the method which comprises positioning said plurality of wires within said tubing, heating a portion of said tubing to render it plastic, pressing said portion while plastic about said wires, and moving certain of said wires apart substantially parallel to one another while said portion is still plastic.

8. In the manufacture of stems from glass tubing having a plurality of wires embedded therein, the method which comprises positioning said wires within said tubing, heating a portion of said tubing to a plastic state, and simultaneously pressing said portion about said wires and shifting certain of said wires substantially parallel to one another while said portion is still plastic to positions spaced greater than the diameter of said tubing.

9. A guide assembly for stem making machines comprising a bifurcated block adapted to receive an internal plunger rod, a stationary guide insert held in said block, an inclined arm on each side of said insert pivotally supported in said block, each of said arms being adapted to be shifted outwardly by said plunger, and means for limiting the outward movement of said arms.

10. The combination in a glass press making machine, comprising a rotatable head having a standard, a guide block assembly supported on said standard, a plurality of movable side portions in said block, a plunger rod engaging said side portions, lever means for supporting a section of flared tubing on said guide block, means for heating said tubing adjacent said guide block, pressing jaws carried by said standard for engaging said tubing after heating, reciprocating means actuating said jaws, and a connecting means between said reciprocating means and said plunger rod.

VICTOR L. RONCI.